United States Patent [19]

Myers

[11] Patent Number: 5,089,552

[45] Date of Patent: Feb. 18, 1992

[54] HIGH CHAR YIELD SILAZANE-MODIFIED PHENOLIC RESINS

[75] Inventor: Ronald E. Myers, Strongsville, Ohio

[73] Assignee: The B. F. Goodrich Company, Brecksville, Ohio

[21] Appl. No.: 447,751

[22] Filed: Dec. 8, 1989

[51] Int. Cl.$^5$ .............................................. C08K 3/38
[52] U.S. Cl. .................... 524/404; 525/393; 524/424; 524/428; 524/439
[58] Field of Search ............... 525/393; 524/404, 424, 524/428, 439

[56] References Cited

U.S. PATENT DOCUMENTS 4,722,988  2/1988  Porte et al. .................... 524/428

FOREIGN PATENT DOCUMENTS 59-81454  4/1984  Japan.
2035337  6/1980  United Kingdom ............. 525/393

OTHER PUBLICATIONS

Effects of Molecular Weight and Cross-Linking on Two Pre-Ceramic Polymers—by Wm. Toreki and Christopher D. Batich.

*Primary Examiner*—Melvyn I. Marquis
*Attorney, Agent, or Firm*—Daniel J. Hudak; Nestor W. Shust

[57] ABSTRACT

The hydrolytic polycondensation of a monomer of

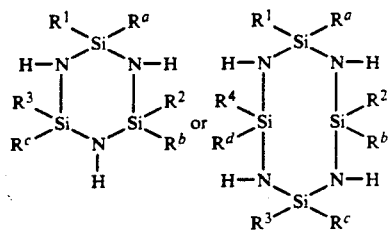

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group; can be carried out directly in the presence of a phenolic resin. This in situ polymerization reaction results in the formation of a new family of polysilazoxane-modified phenolic resins. Modified phenolic resins may also be prepared by the controlled hydrolysis of the above monomers in the presence of initiators. The polysilazoxane so formed is blended into a phenolic resin. The organic soluble thermosetting resins exhibit synergistic char yields of 63 to 80 wt. % (1500° C./$N_2$).

24 Claims, 1 Drawing Sheet

1

HIGH CHAR YIELD SILAZANE-MODIFIED PHENOLIC RESINS

FIELD OF THE INVENTION

This invention relates to thermally stable high char yield, polysilazoxane-modified phenolic resins. More specifically, this invention relates to a composition of matter that is a reaction product between a phenolic resin (containing residual water and phenol normally present as a result of its manufacture) and a silazane, as well as a phenolic resin (with residual water and phenol) that is modified by blending in a controlled hydrolysis product of a silazane monomer.

BACKGROUND

Phenolic resins have utility in both the uncarbonized and carbonized forms, the choice of forms being dependent upon the performance criteria required for specific applications. In the uncarbonized form, phenolic resins can be used, for example, as adhesives, coatings, and matrix resins. Although phenolic resins are typically thermally stable and resistant to chemical attack, most unfilled and/or unmodified phenolic resins have a maximum use temperature of <200° C. The utility of phenolic resins in the uncarbonized form would be extended and enhanced if the thermal stability of the resins were improved. In the carbonized form, phenolic resins are useful, for example, as prepreg and densification resins. As a prepreg resin, the phenolic resin, in the uncarbonized form, serves to bind together or laminate various articles.

Japanese patent application No. 81,454, filed Apr. 23, 1984, relates to the production of beta type SiC by heating a silicon and carbon containing raw material in a non-oxidizing atmosphere using catalysts such as mineral acids.

The present invention describes inherently oxidation resistant, high char resins. The resins of this invention are based on ceramic precursor polymers, i.e., metal-organic polymers which yield ceramic/refractory phases upon pyrolysis. This patent application describes silazane-modified phenolic resins and their utility in resin matrix composites and adhesives.

SUMMARY OF THE INVENTION

This invention is directed to a modified phenolic resin prepared by the in situ polymerization of a monomer of

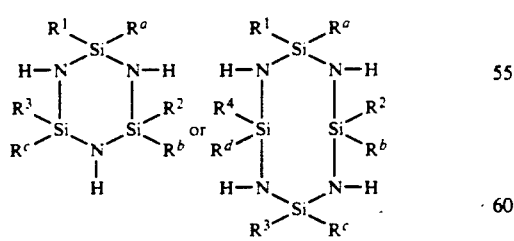

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group; with a phenolic resin.

DETAILED DESCRIPTION OF THE INVENTION

Figure 1:
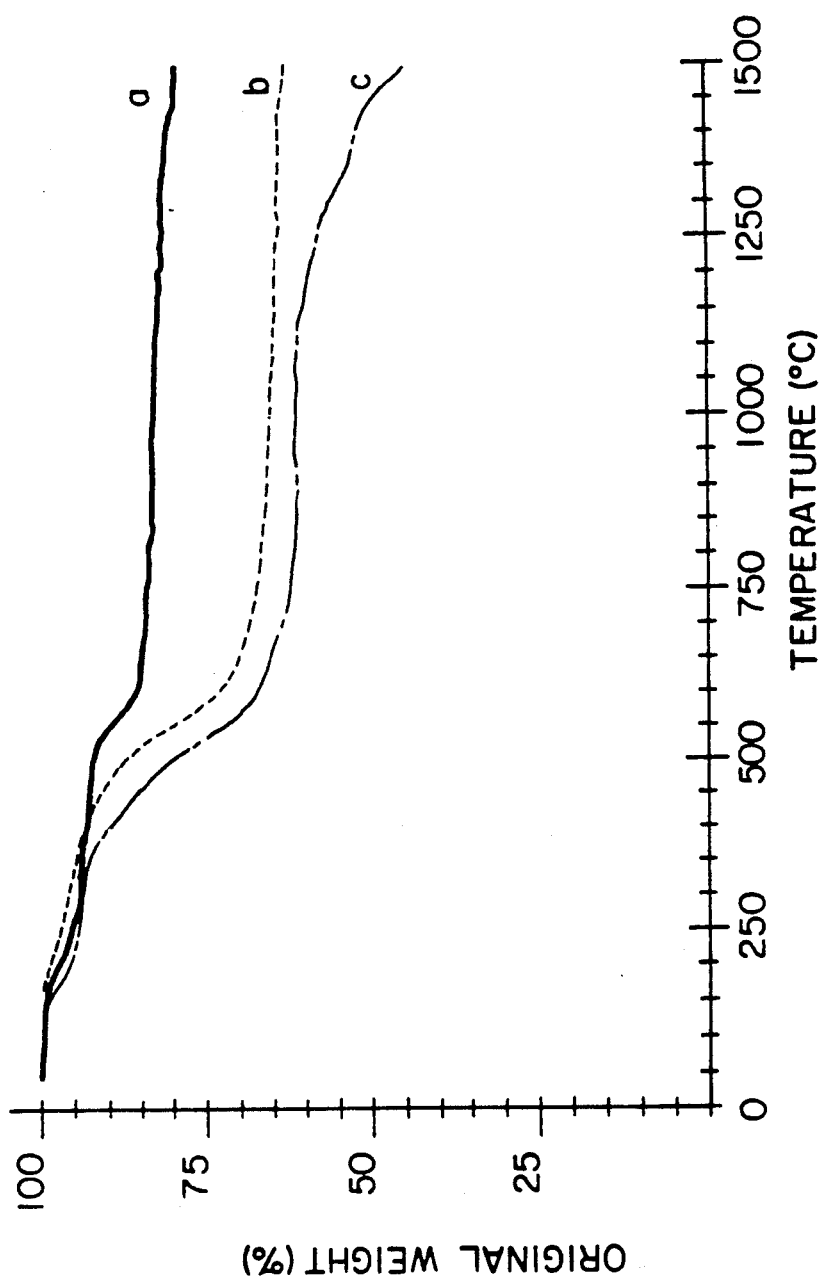
FIG. 1 TGA profiles, in dry $N_2$, for: a) 3:1 wt/wt SC-1008:TMTVTS reaction product, b) 3:1 wt/wt SC-1008:PMVS blend, c) SC-1008 phenolic resin (see Table I for B-staging conditions).

The silazane modified phenolic resins of the present invention are prepared by the in situ polymerization of a cyclic silicon-nitrogen monomer with a phenolic resin.

The cyclic silicon-nitrogen monomer is represented by the structure

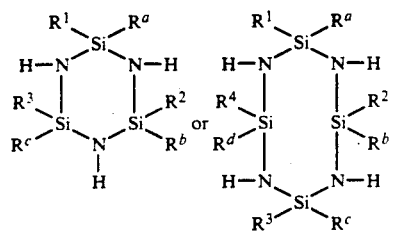

wherein $R^1$, $R^2$, $R^3$, and $R^4$ are independently alkyl groups containing from 1 to 4 carbon atoms, and preferably 1 to 2 carbon atoms. $R^a$, $R^b$, $R^c$, and $R^d$ are independently alkenyl or alkyl groups containing from 2 to 6 carbon atoms, preferably 2 to 4 carbon atoms, and most preferably 2 to 3 carbon atoms, with the proviso that at least one of $R^a$, $R^b$, $R^c$, and $R^d$ is an alkenyl group.

Within the alkenyl group the double bond may be terminal such as vinyl ($-CH=CH_2$), allyl ($-CH_2CH=CH_2$), 1-butenyl ($-CH_2CH_2CH=CH_2$), 1-pentenyl ($-CH_2CH_2CH_2CH=CH_2$), and 1-hexenyl ($-CH_2CH_2CH_2CH_2CH=CH_2$). The double bond may also be internal. Representative examples of the latter are 2-butenyl ($-CH_2CH=CHCH_3$) and 3-pentenyl ($-CH_2CH=CHCH_2CH_3$). Additionally, the carbon atoms may be branched such as 3-methyl-1-butenyl

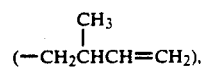

2,3-dimethyl-1-butenyl

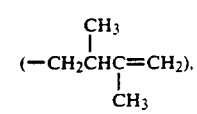

and 3,3-dimethyl-1-butenyl

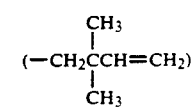

In the preferred embodiment within the trimer, $R^1=R^2=R^3=$methyl and $R^a=R^b=R^c=$vinyl giving the structure

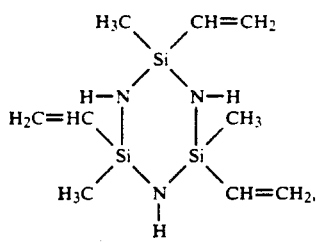

(1,3,5-trimethyl-1,3,5-trivinylcyclotrisilazane) abbreviated as TMTVTS.

Phenolic resins having utility in this application are the reaction product of phenol and formaldehyde. The reaction product is of the novolac or resole formation. For a discussion of the synthesis and properties of phenolic resins, see "Phenolic Resins," Knop and Pilato, Springer-Verlag, pages 91–102 (1985), the disclosure of which is herein incorporated by reference. The two formations are outlined below.

NOVOLAC FORMATION

In the presence of acid catalysts and with the mole ratio of formaldehyde to phenol less than 1, the methylol derivatives condense with phenol to form first dihydroxydiphenylmethane:

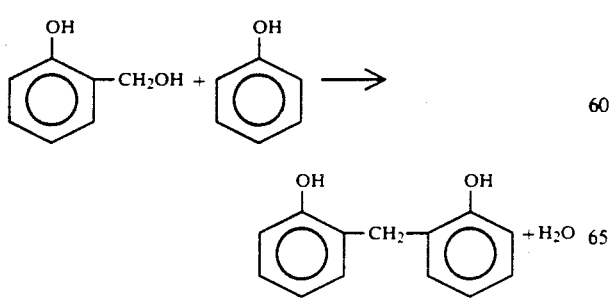

and on further condensation and methylene bridge formation, fusible and soluble linear low polymers called novolacs with the structure

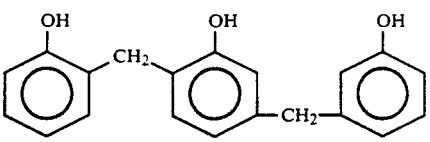

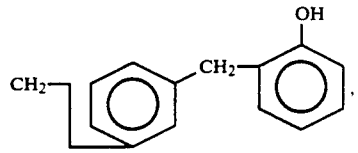

etc., where or and para occur at random. Molecular weights may range as high as 1000, corresponding to about 10 phenyl moieties. These materials do not themselves react further to give crosslinked resins, but must be reacted with more formaldehyde to raise its mole ratio to phenol above unity.

RESOLE FORMATION

In the presence of alkaline catalysts and with more formaldehyde the methylol phenols can condense either to methylene linkages or to ether linkages. In the latter case, subsequent loss of formaldehyde may occur with methylene bridge formation.

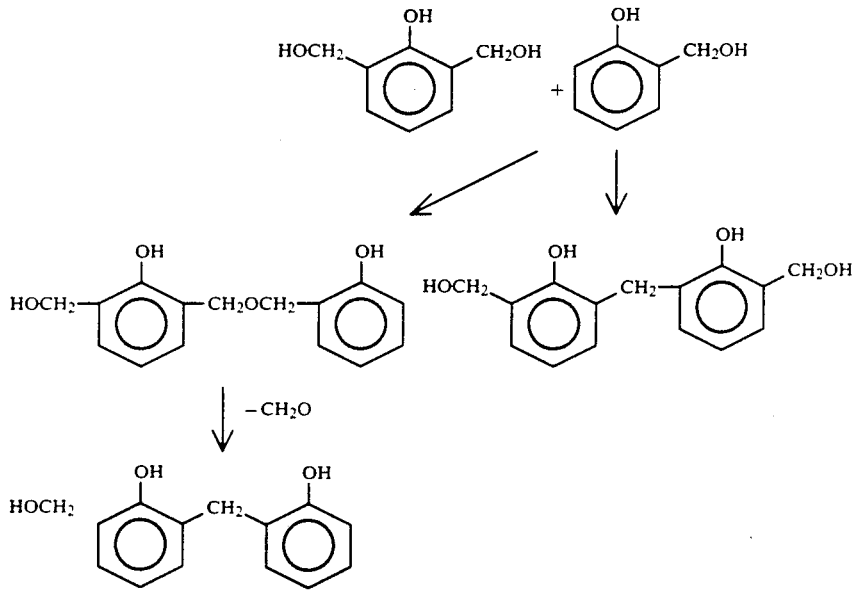

Products of this type, soluble and fusible but containing alcohol groups, are called resoles. If the reactions leading to their formation are carried further, large numbers of phenolic nuclei can condense to give network formation.

The formation of resoles and novolacs respectively leads to the production of phenolic resins by one-stage and two-stage processes.

ONE-STAGE RESIN

In a production of a one-stage phenolic resin, all the necessary reactants for the final polymer (phenol, formaldehyde and catalyst) are charged into a resin kettle and reacted together. The ratio of formaldehyde to phenol is about 1.25:1, and an alkaline catalyst is used.

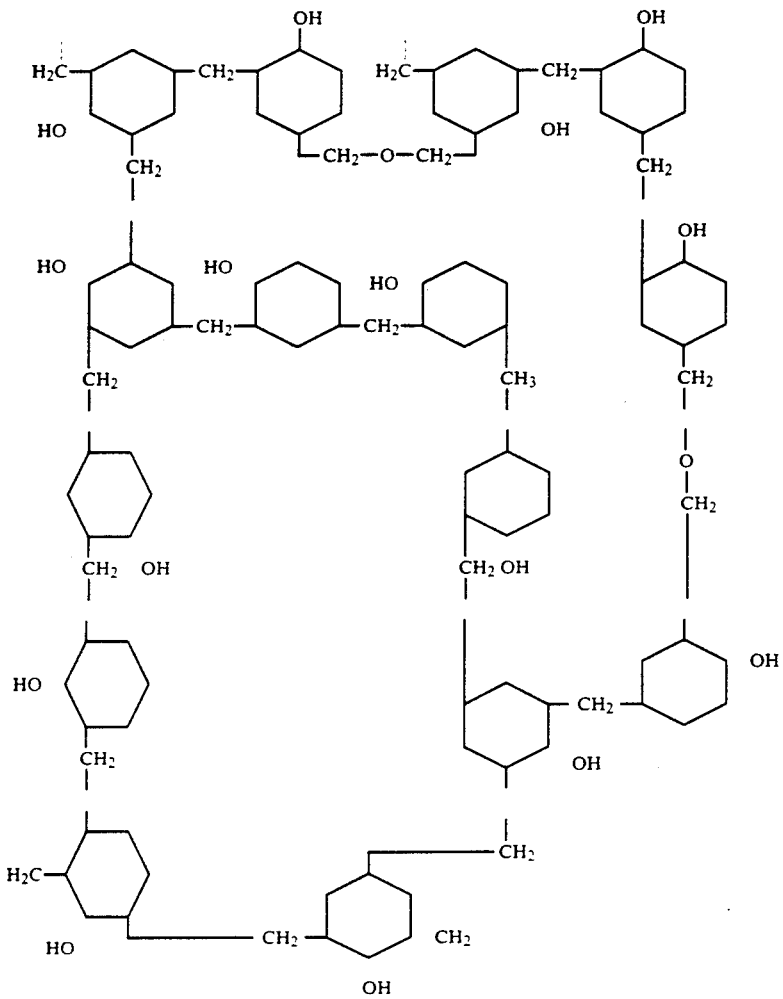

TWO-STAGE RESIN

These resins are made with an acid catalyst and only part of the necessary formaldehyde is added to the kettle producing a mole ratio of approximately 0.8:1. The rest is added later as hexamethylenetetramine (HMTA)

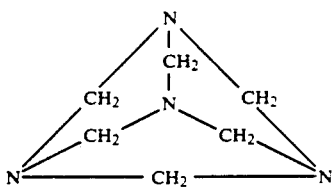

which decomposes in the final curing step with heat and moisture present to yield formaldehyde and ammonia which acts as a catalyst for curing.

RESIN FORMATION

The procedures for one and two-stage resins are similar and the same equipment is used for both. The reaction is exothermic and cooling is required. A formation of a resole or a novolac is evidenced by an increase in viscosity. Water is then driven off under vacuum and a thermoplastic A-stage resin, soluble in organic solvents, remains. This material is dumped from the kettle, cooled, and ground to a fine powder.

At this point, fillers, colorants, lubricants, and (if a two-stage resin) enough hexamethylenetetramine to give a final formaldehyde:phenol mole ratio of 1.5:1 are added. The mixture is rolled on heated mixing rolls where the reactions are carried further, to the point where the resin is in the B-stage, nearly insoluble in organic solvents, but still fusible under heat and pressure. The resin is then cooled and cut into final form. The C-stage, the final, infusible, crosslinked polymer is reached on subsequent fabrication, for example by molding. Numerous other types of phenolic resins known to the art and in the literature may also be employed in the practice of this invention.

Commercially available phenolic resins generally contain both residual water (usually 1-20, preferably 1-10 and most preferably 1-5 wt. %) and residual phenol (normally about 10-20 wt. %). Borden's SC-1008 phenolic resin, for example, normally contains about 1 to 3 wt. % water and about 15 wt. % phenol in addition to about 25 wt. % isopropyl alcohol and about 1 wt. % formaldehyde. These residuals, specifically water and phenol, enter into the synthesis of a new family of thermosetting, preceramic polymers.

The hydrolytic polycondensation reaction involving silazane, as described in my said copending application Ser. No. 07/447,931, filed on 12/8, 1989, can be carried out directly in the presence of the phenolic resin. The silazane readily reacts with the residual water and phenol in a phenolic resin. Thus, upon mixing various wt/wt ratios of a silazane with a phenolic resin at room temperature, an initial, mild exotherm (40° C.) is observed, followed by a stronger exotherm (60° C.) several seconds later. Stirring, either mechanical or by hand, is maintained throughout the reaction. During the reaction, which is complete within minutes at ambient temperature, foaming occurs and ammonia is evolved. The resulting polysilazoxane-modified phenolic resin is essentially identical in appearance (color and viscosity) to the unmodified phenolic resin. And most importantly, with the proper adjustment of the reactant ratio, the polysilazoxane-modified phenolic resin retains the processability (i.e., B-staging and thermosetting characteristics) of the unmodified phenolic resin.

The order of addition at room temperature has an impact on shelf life. A longer shelf life is obtained for the modified phenolic resin when the silazane monomer is added to the phenolic resin at room temperature. However, order of addition has no effect on char values.

The reaction of the monomer and phenolic resin is generally carried out at a temperature of from ambient up to about 125° C. and preferably from ambient up to about 100° C. It is important to remain below 125° C. in order to avoid premature B-staging, i.e., partial cure. The weight ratio of monomer:phenolic resin is typically from 4:1 to 1:4, preferably from 3:1 to 1:3.2, and most preferably from 2:1 to 1:3.2.

This invention also contemplates a composition of a blend of polysilazoxane prepared by the hydrolytic polymerization of a monomer of

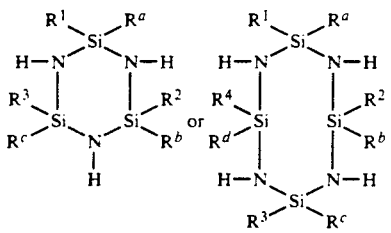

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group; with a phenolic resin. The various substituents on the monomers are as earlier disclosed.

Hydrolyzing trimethyltrivinylcyclotrisilazane (TMTVTS) provides an organic soluble polymethylvinylsilazoxane (PMVS). A controlled hydrolysis of the monomer is carried out in the presence of initiators, specifically a dual initiator system or optionally in the presence of water alone. The controlled hydrolysis of the monomer can be effected by utilizing a dual initiator system of an aqueous persulfate/thiosulfate catalyst system. The Group I persulfate/Group I thiosulfate initiators are present in a mole ratio of from 1:0.85 to 0.85:1, preferably 1:0.95 to 0.95:1, and most preferably from 1:1.

The controlled hydrolysis of the monomer can be effected by utilizing a dual initiator system of an aqueous Group I metal persulfate/Group I metal thiosulfate catalyst system. Group I metals having utility as the persulfate/thiosulfate salts are lithium, sodium and potassium. In the practice of this embodiment, the initiator system may be potassium persulfate with potassium thiosulfate, sodium persulfate with sodium thiosulfate, potassium persulfate with sodium thiosulfate or sodium persulfate with potassium thiosulfate. Lithium may be substituted with sodium or potassium or may be used in addition to sodium and/or potassium. The dual initiator system takes its name from the fact that there is at least one persulfate and at least one thiosulfate. In practicing this embodiment, a persulfate salt mixture of lithium, sodium, and potassium may be utilized along with a thiosulfate salt mixture of lithium, sodium and potassium.

In order to effect the controlled hydrolysis, the water:initiator mole ratio is from 150:1 to 400:1, preferably 200:1 to 300:1, and most preferably 200:1 to 250:1, and the water:monomer mole ratio is from 1.5:1 to 4:1, preferably 2:1 to 3:1, and most preferably 2:1 to 2.5:1.

In order for the polymerization to begin, heat is applied. Generally the reaction temperature is from about 100° C. to about 190° C. and preferably from about 130° C. to about 150° C. Ammonia is evolved during the reaction. Generally, temperatures in excess of those noted are avoided inasmuch as they tend to produce an intractable product. Inasmuch as the polymerization is only slightly exothermic, heat must be applied thereto. The polymerization is generally a hydrolytic condensation polymerization with some ring opening occurring. The number average molecular weight ($M_n$) of the formed polymer is at least about 3,000 and desirably from about 10,000 to about 100,000. Generally, it appears that the length of time of polymerization and the water:monomer mole ratio is directly proportional to the amount of siloxane units produced. The amount of siloxane in the end polymer is generally from about 65 percent to about 98 percent, preferably from 80 percent to about 98 percent, and most preferably from 85 percent to about 98 percent by weight. Some silazane groups, within the polymer structure, are always desirable inasmuch as they are easily charred and yield better char properties.

On the basis of IR spectroscopy, NMR and elemental analysis, the PMVS produced from the hydrolysis of TMTVTS is believed to have the following formulation (Formula I):

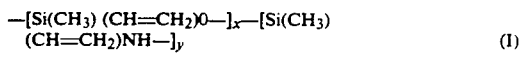

(I)

The values of x (siloxane content) and y (silazane content) in the above formulation will, of course, vary somewhat as a function of the extent of hydrolysis. The x and y components together make up the polysilazoxane. The above structure is not meant to imply that the polysilazoxane is exclusively linear. Some cyclic and branched moieties may also be present within the polysilazoxane. Moreover, the polysilazoxane is a random copolymer containing siloxane and silazane moieties.

The preceramic polymers described in this invention can be used as high temperature resistant phenolic resins and can be used in the manufacture of ablative compositions, high temperature adhesives and flame retardant materials.

The following examples are illustrative of the preparation of the polysilazoxane polymers. Unless otherwise indicated, all parts and percentages are by weight.

EXAMPLE 1

TMTVTS (122.34 g, 0.48 mole) was placed in a 500 mL three-neck, round bottom flask equipped with thermometer, reflux condenser, blade stirrer and addition funnel. An aqueous persulfate/thiosulfate "catalyst" solution [0.38 g (0.0024 mole) $Na_2S_2O_3$ and 0.65 g (0.0024 mole) $K_2S_2O_8$ dissolved in 19.8 mL (1.1 mole) water] was then added drop-wise to the TMTVTS with rapid stirring under a nitrogen blanket. The reaction mixture was then heated at 130° C. for 10 hours/$N_2$. During the initial stage of the reaction, it was necessary to use a slow rate of heating (two hours to reach 130° C.) in order to control foaming due to ammonia evolution. The reaction mixture was then cooled to 22° C., and the resulting pale yellow, viscous liquid was dissolved in 250 mL of dichloromethane; the polymer solution was then dried over $CaSO_4$ for 16 hours. After filtering to remove the $CaSO_4$, the polymer solution was freed of dichloromethane by rotary evaporation (70° C., water aspirator). After vacuum drying (60° C./3 hours), polymethylvinylsilazoxane (PMVS) was obtained as a pale yellow, viscous liquid; yield 107 g. PMVS is soluble in dichloromethane, THF and toluene. The resulting PMVS has a molecular weight $M_n=42,100$ and $M_w=89,400$. Elemental analysis (in weight percent): carbon—41.97, hydrogen 7.27, nitrogen—3.33, silicon-29.65, and oxygen (by difference)—17.78.

EXAMPLE 2

The procedure of Example 1 was followed except that the reaction time was increased from 10 hours to 16.5 hours. The resulting PMVS had a molecular weight $M_n = 51,700$ and $M_w=132,000$.

EXAMPLE 3

The procedure of Example 1 was followed except that the reaction time was increased from 10 hours to 20 hours. The resulting PMVS had a molecular weight $M_n=87,000$ and $M_w=334,000$.

EXAMPLE 4

The procedure of Example 1 was followed except that half the level of both water and TMTVTS were utilized 0.55 moles and 0.24 moles, respectively, and the reaction time was 8.5 hours. The resulting PMVS had a molecular weight $M_n=59,500$ and $M_w=181,500$.

PMVS/SC-1008 blends can be prepared by simply mixing (hand-stirring) various wt/wt ratios of the two components, followed by a B-staging operation (heating the mixture in air to effect a lightly crosslinked resin). The materials produced from these experiments (using mixtures containing 10–75 wt. % phenolic resin) varied from heterogeneous to homogenous in appearance, depending upon the PMVS content.

These blends showed char yields significantly greater than those calculated on the basis of the thermal properties of the component resins. For example, a 3:1 wt/wt blend (SC-1008:PMVS), after B-staging in air for 30 minutes at 150° C., had a 63% char yield at 1500° C./$N_2$ (TGA). The char yields obtained on the individual component resins, under identical TGA conditions, were found to be 43% and 60% respectively for SC-1008 and PMVS. More pronounced synergistic char yields were observed for blends containing higher concentrations of PMVS. For example, a 1:4 wt/wt blend (SC-I1008:PMVS) showed a 77% char yield at 1500° C./$N_2$; compared to a calculated char yield of 57% based on the thermal properties of the component resins.

PREPARATION OF PMVS/PHENOLIC RESIN BLENDS

PMVS and SC-1008 phenolic resin, in various wt/wt ratios (10–75 wt. % phenolic resin), were blended together at 22° C. (hand-mixed for 10 minutes). These blends appear in Table I as items d and e. The resulting mixtures were then B-staged at 150° C./30–75 minutes in an air circulating oven.

PREPARATION OF POLYSILAZOXANE-MODIFIED PHENOLIC RESINS (IN-SITU-POLYMERIZATION)

TMTVTS (1.0 g) was added in one portion to 3.2 g of SC-1008 phenolic resin (the SC-1008 resin, as supplied by Borden Chemical Co., contained 2-3 wt. % water and 14.9 wt. % phenol). Immediately upon mixing the components at 22° C., an initial exotherm was noted (temperature increased to 40° C.) followed by an additional exotherm (to 60° C.) within a few seconds. Ammonia evolution, accompanied by foaming, also was observed. The reaction mixture was hand-stirred for 5 minutes, at which time the temperature of the system had returned to ambient. The reaction mixture was then heated at 75° C./2 hrs/$N_2$. (This additional heating was found to improve the shelf-life of the polysilazoxane-modified phenolic resin). The resulting polysilazoxane-modified phenolic resin was essentially identical in appearance (color and viscosity) to the unmodified SC-1008 resin. The polysilazoxane-modified resin was then B-staged at 125°–150° C./30 minutes in an air circulating oven. This polysilazoxane-modified phenolic resin appears in Table I as item f.

Two additional polysilazoxane-modified phenolic resins were prepared as above wherein 1 and 2 grams of TMTVTS were added to 2 and 1 grams, respectively, of SC-1008 resin. The polysilazoxane-modified phenolic resin appears in Table I as items g and h respectively.

This invention also contemplates the use of other additives in combination with the modified phenolic resins. Such additives include, for example, refractory materials and fibers.

Refractory materials impart suitable oxidation resistance to the modified phenolic resins. Suitable refractory materials are boron carbide, boron nitride, boron metal, silicon carbide, and silicon nitride. Refractory materials, when utilized, are usually present up to about 40% by weight. Typically the refractory material is present from about 5 to about 30 percent.

Suitable fiber materials include conventional refractory fibers such as SiC. Normally, composites contain from 35 to 65 volume percent of a fiber material.

TABLE I

| Thermal Analysis (TGA) of Silazane-Modified Phenolic Resins | | | |
|---|---|---|---|
| Item | Sample Composition | B-Stage Conditions (air) | Temp. (°C.) of Initial wt. loss/$N_2$ | Wt. % Char at 1500° C./$N_2$ |
| a. | SC-1008[a] | 15 | 150 | 43 |

TABLE I-continued

Thermal Analysis (TGA) of Silazane-Modified Phenolic Resins

| Item | Sample Composition | B-Stage Conditions (air) | Temp. (°C.) of Initial wt. loss/$N_2$ | Wt. % Char at 1500° C./ $N_2$ |
|---|---|---|---|---|
| b | TMTVTS[b] | min/150° C. — | 110 | 0 |
| c | PMVS | — | 150 | 60 |
| d | SC-1008:PMVS (1:4 wt/wt) | 75 min/150° C. | 250 | 77 |
| e | SC-1008:PMVS (3:1 wt/wt) | 30 min/150° C. | 200 | 63 |
| f | SC-1008:TMTVTS (3.2:1 wt/wt) | 30 min/150° C. | 175 | 80 |
| g | SC-1008:TMTVTS (2:1 wt/wt) | 40 min/125° C. | 400 | 80 |
| h | SC-1008:TMTVTS (1:2 WT/WT) | 20 min/125° C. | 200 | 68 |

[a]Phenolic resin (Borden Chemical Co.)
[b]Trimethyltrivinyltrisilazane (Petrarch Systems)

As shown in Table I and FIG. 1, the thermal stability of the TMTVTS-modified phenolic resins is quite good. TGA experiments show onset of weight loss occurring in the range of 175°–400° C., with char yields of 68–80 wt. % (1500° C./$N_2$) for several formulations of the TMTVTS-modified phenolic resins. These modified phenolic resins exhibit a pronounced synergistic charring effect; the reactants, SC-1008 and TMTVTS, having char yields of 43 wt. % and 0 wt. %, respectively, under identical TGA conditions. For comparison, char yield data for several of the PMVS/phenolic resin blends are also shown in Table I. FIG. 1 depicts actual TGA profiles ($N_2$) obtained on the following B-staged samples: SC-1008 phenolic resin, a 3:1 wt/wt (SC-1008: PMVS) blend, and a 3.2:1 wt/wt (SC-1008:TMTVTS) polysilazoxane-modified phenolic resin.

While in accordance with the Patent Statutes, the best mode and preferred embodiment has been set forth, the scope of the invention is not limited thereto, but rather by the scope of the attached claims.

What is claimed is:

1. A composition, comprising:
a modified phenolic resin prepared by the hydrolytic polycondensation in the presence or absence of initiators of a monomer of

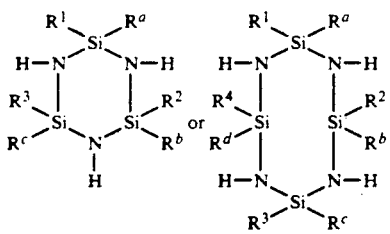

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group; with
a phenolic resin containing from about 1 up to about 20 percent by weight water.

2. The composition of claim 1, wherein $R^1$, $R^2$, $R^3$, and $R^4$ are independently alkyl groups containing from 1 to 2 carbon atoms.

3. The composition of claim 2, wherein $R^a$, $R^b$, $R^c$, and $R^d$ are independently alkyl or alkenyl groups containing from 2 to 4 carbon atoms.

4. The composition of claim 3, wherein $R^a$, $R^b$, $R^c$, and $R^d$ are independently alkyl or alkenyl groups containing from 2 to 3 carbon atoms.

5. The composition of claim 1, wherein said phenolic resin is produced by a one-stage or two-stage process.

6. The composition of claim 5, wherein the phenolic resin contains from about 1 to about 5 percent residual water and from about 10 to about 20 percent residual phenol.

7. The composition of claim 6, wherein the phenolic resin is added to the monomer at room temperature.

8. The composition of claim 6, wherein the monomer is added to the phenolic resin at room temperature.

9. The composition of claim 8, wherein after an exothermic reaction, the temperature is increased up to 100° C.

10. The composition of claim 9, wherein the monomer to phenolic resin mole ratio is from 4:1 to 1:4.

11. The composition of claim 10, wherein up to about 40 percent by weight of a refractory material is present.

12. The composition of claim 11, wherein from about 5 to about 30 percent by weight of a refractory material is present.

13. The composition of claim 12, wherein the refractory materials are silicon carbide, boron carbide, boron metal, or silicon nitride.

14. A composition comprising a blend of polysilazoxane wherein said polysilazoxane includes both siloxane and silazane moieties which is prepared by the polymerization of a monomer of

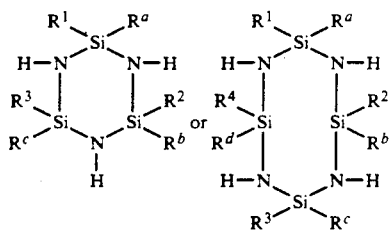

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, and $R^c$, or $R^d$ group is an alkenyl group, wherein said polymerization occurs by controlled hydrolysis wherein the water:initiator mole ratio is from 150:1 to 400:1, comprising an aqueous system with a phenolic resin.

15. The composition of claim 14, wherein said aqueous system contains a dual initiator system, wherein said dual initiator system contains at least one persulfate and at least one thiosulfate.

16. The composition of claim 14, wherein the siloxane:silazane moieties in the polysilazoxane are in a weight ratio of at least 65:35.

17. The composition of claim 15, wherein the number average molecular weight ($M_n$) of the formed polymer is at least 3,000.

18. The composition of claim 17, wherein $R^1$, $R^2$, $R^3$, and $R^4$ are independently alkyl groups containing from 1 to 2 carbon atoms.

19. The composition of claim 18, wherein $R^a$, $R^b$, $R^c$, and $R^d$ are independently alkyl or alkenyl groups containing from 2 to 4 carbon atoms.

20. The composition of claim 19, wherein $R^a$, $R^b$, $R^c$, and $R^d$ are independently alkyl or alkenyl groups containing from 2 to 3 carbon atoms.

21. The composition of claim 20, wherein said dual initiators are persulfate/thiosulfate.

22. The composition of claim 21, wherein said persulfate/thiosulfate initiators are present in a mole ratio of from about 1:0.85 to about 0.85:1.

23. The composition of claim 22, wherein the water:initiator mole ratio is from about 150:1 to about 400:1.

24. The composition of claim 23, wherein the water:monomer mole ratio is from about 1.5:1 to about 20:1.

* * * * *